United States Patent
Bennin et al.

[11] Patent Number: 5,391,842
[45] Date of Patent: Feb. 21, 1995

[54] CARRIER STRIP HEAD INTERCONNECT ASSEMBLY

[75] Inventors: Jeffry S. Bennin, Hutchinson; Kevin D. Bjork, Litchfield; Todd W. Boucher, Stewart; James H. Dettmann, Lester Prairie; Michael T. Hofflander, Edina, all of Minn.

[73] Assignee: Hutchinson Technology, Inc., Hutchinson, Minn.

[21] Appl. No.: 243,538

[22] Filed: May 16, 1994

Related U.S. Application Data

[63] Continuation of Ser. No. 808,406, Dec. 16, 1991, abandoned.

[51] Int. Cl.⁶ ............................................. H05K 1/02
[52] U.S. Cl. .................... 174/260; 174/250; 174/255; 360/104; 360/106; 360/108
[58] Field of Search ............. 174/250, 254, 255, 260, 174/261; 360/104, 106, 108

[56] References Cited

U.S. PATENT DOCUMENTS

| | | | |
|---|---|---|---|
| 3,195,079 | 7/1965 | Burton et al. | 174/254 |
| 4,616,279 | 10/1986 | Poorman | 360/103 |
| 4,645,280 | 2/1987 | Jordon et al. | 339/17 F |
| 4,670,804 | 6/1987 | Kant et al. | 360/102 |
| 4,819,094 | 4/1989 | Oberg | 360/104 |
| 4,853,811 | 8/1989 | Brooks et al. | 360/103 |
| 4,991,045 | 2/1991 | Oberg | 360/104 |
| 5,001,583 | 3/1991 | Matsuzaki | 360/104 |
| 5,006,946 | 4/1991 | Matsuzaki | 360/104 |
| 5,012,368 | 4/1991 | Bosier et al. | 360/104 |
| 5,121,273 | 6/1992 | Slezak | 360/104 |

Primary Examiner—Leo P. Picard
Assistant Examiner—L. Thomas
Attorney, Agent, or Firm—Faegre & Benson

[57] ABSTRACT

An electrical head interconnect assembly is fabricated for installation upon the suspension member supporting a magnetic read/write head over a rotating storage disk of a magnetic disk drive. A head interconnect is comprised of a film carrier strip upon which conducting elements are positioned and bonded. The carrier strip can be of plastic, metallic, cellulosic, or composite construction. The conducting elements, fabricated of 1 or more twisted or parallel lengths, are routed along a prepatterned carrier strip defining the X, Y, and Z coordinate positioning required to mate with a suspension member without manual routing or manipulation. In addition, the conducting elements are fixedly spaced with stripped insulation at both termination points of the interconnect (electronics and head) allowing prepositioned, automatable bonding to connective pads. A suspension member positioned and bonded within the strip at appendage sites, completes the installation of the conducting elements upon the suspension. The carrier then serves to secure the conductors and suspension within the protective framework of the strip and provides patterned tooling references until excised upon completion of head suspension assembly.

28 Claims, 3 Drawing Sheets

CARRIER STRIP HEAD INTERCONNECT ASSEMBLY

This is a continuing application of Ser. No. 07/808,406, filed Dec. 16, 1991, and now abandoned.

BACKGROUND OF THE INVENTION

SUMMARY OF THE INVENTION

1. Technical Area of the Present Invention

In a magnetic disk drive, a slider (or head) is flown above a spinning storage disk. Attached to the slider is a read/write transducer which transforms electrical pulses to small magnetic fields which are stored on the disk. The order of the magnetic fields and their subsequent orientation, aligned along the circumference of the disk in north-south configuration, defines a bit code capable of detection as the slider flies over the disk. The sliders are held in place above the disk by a metal spring structure known in the industry as a suspension. This suspension attaches to a rigid arm manipulated by a linear or rotary motion actuator designed to locate the slider at any radial position above the disk. The spinning disk coupled with the actuator movement serves to gain access to multiple tracks across the disk surface, each capable of containing stored data for later retrieval.

Signal transmission from the slider transducer to the amplifier and signal processing circuitry of the disk file, necessitates the need for an electrical interconnect between the dynamic, "flying" slider, and the static circuitry of the data channels. A printed flexible circuit routed from the signal processing circuitry to the vicinity of the actuator arms, connects with conductive wire(s) to complete the final path down the suspension to the slider.

The interconnect routed down the suspension typically contains a minimum of two conductors serving the slider transducer comprised of a single inductive element to read and write. Transducer designs may also incorporate a separate magneto-resistive read element and an inductive write element requiring a minimum of 3 wires if the elements are tied together or a minimum of 4 wires if the elements are completely separate. The dynamic requirements of flying the slider close to the disk surface (<0.1 micrometer) necessitates minimum mass, stiffness, and size for this interconnect.

2. Description of the Prior Art.

This invention pertains to the interconnecting device spanning the suspension, from the slider transducer to the printed flexible circuit mating with or containing the signal processing devices. As the industry transitions to smaller slider/transducer sizes to increase data storage density, limitations of the current interconnecting devices increases the potential for read/write errors and imposes ceilings on data storage density.

Prior art portrays heavy reliance upon the use of small insulated copper wires (44 AWG or smaller diameter) threaded into PTFE tubing (0.25 mm–0.38 mm. in diameter). Enclosing the insulated copper wires within the tubing provides protection from potentially damaging vibrational contact with the suspension member. The PTFE tube typically extends from the suspension tip along the side or central rails, top or bottom surface of the suspension, to the base plate region and beyond. To avoid reducing the dynamic performance and flight characteristics of the slider, only the fine wires are routed past the suspension out to the slider bond sites. Among references to the use of the tube and wire interconnect include U.S. Pat. Nos. 5,012,368, 4,853,811, 4,991,045.

Limitations of the art encompass various areas. Manual conductor routing (along the suspension) and service loop shape setting, can induce unfavorable static slider bias or bias variability. Lack of orientation, placement, and spacing definition of free form twisted conductors at bond sites increases bias variability and bond positioning labor. Usage of suspension appendages termed "wire-crimps", to anchor PTFE tubular wire sheaths, have the potential of inducing internal stresses to the suspension and damaging the twisted conductors. Profile limitations imposed by PTFE tubing and wire crimp tabs can limit disk stack height. Individual positioning and bonding of conductors to the slider and amplifier/signal processing electronic cable can require significant labor. As the head suspension assembly becomes more automated, the manual routing/bonding of the tube and wire interconnect poses an obvious constraint.

Other interconnect inventions detail the usage of flat or round conductive wires laminated within plastic film layers (i.e. flexible printed circuitry: additive or subtractive), playing upon the advantages of low profile, controlled impedance, spaced leads, and favorable dynamic response. These basic U.S. patents include #'s 4,819,094, 4,670,804, 4,645,280, 4,616,279. As referenced in U.S. Pat. No. 4,645,280, the flexible printed circuit interconnects are often adhesively bonded to the suspension structures. Although profile, electrical performance, and automation compatible advantages of printed flexible circuitry as interconnect prove favorable, the economic impact of high volume usage must be considered. In addition, film substrates used within flexible printed circuitry can lend a higher stiffness value to the interconnect in the vicinity of the service loop area. Materials thin enough to negate this factor are difficult to work with.

A third representation of prior art involves the utilization of plastic compounds either complementing the function of (such as a thin film overlay) or comprising an integral element of the suspension structure. The conductive wires of the interconnect can either be heat staked or molded into plastic structure providing advantages of low profile, favorable dynamic response, and protective attachment to the suspension. U.S. Pat. No. 4,991,045 details such a composite suspension design, while U.S. Pat. Nos. 5,006,946 and 5,001,583 detail conductors contained within or upon polymeric resinous (plastic) materials. As the fly height and transducer/slider size continually decrease in the progression of greater disk storage density, the accuracy and control needed to align the transducer to the correct data track upon the disk surface follows suit. The usage of thermally expansive plastics as structural elements of the suspension or head gimbal region poses dimensional stability limitations.

SUMMARY OF THE INVENTION

The invention of interest defines a head interconnect assembly comprised of conductive elements such as parallel or twisted wire(s) of 44 AWG fixedly attached to prepatterned film carrier. The conductors are routed down the carrier strip matching a predetermined orientation and placement. Conductor routing matches the pattern required to mate with the suspension member without manual manipulation during assembly. At both the slider and electronics end of the interconnect, the conductors are fixedly spaced with the option of having the insulative coating stripped, to match multiple bonding pad placement and orientation. Additionally, the carrier strip shall contain patterned features defining open regions of accommodation for the suspension and appendages of support for the mating conductors as well as provision for mechanized tooling and assembly. The appendages extending outward into the open regions of the carrier strip shall define the bonding sites of the conductors to the carrier. At final assembly, the conductor support appendages are separated from the main body of the strip leaving only those elements essential to the protection, support, and attachment of the interconnect to the suspension. The interconnect shall be attached to the suspension via adhesive, mechanical fastening, or thermoplastic reflow bond.

DETAILED DESCRIPTION OF THE INVENTION

Figure 1:
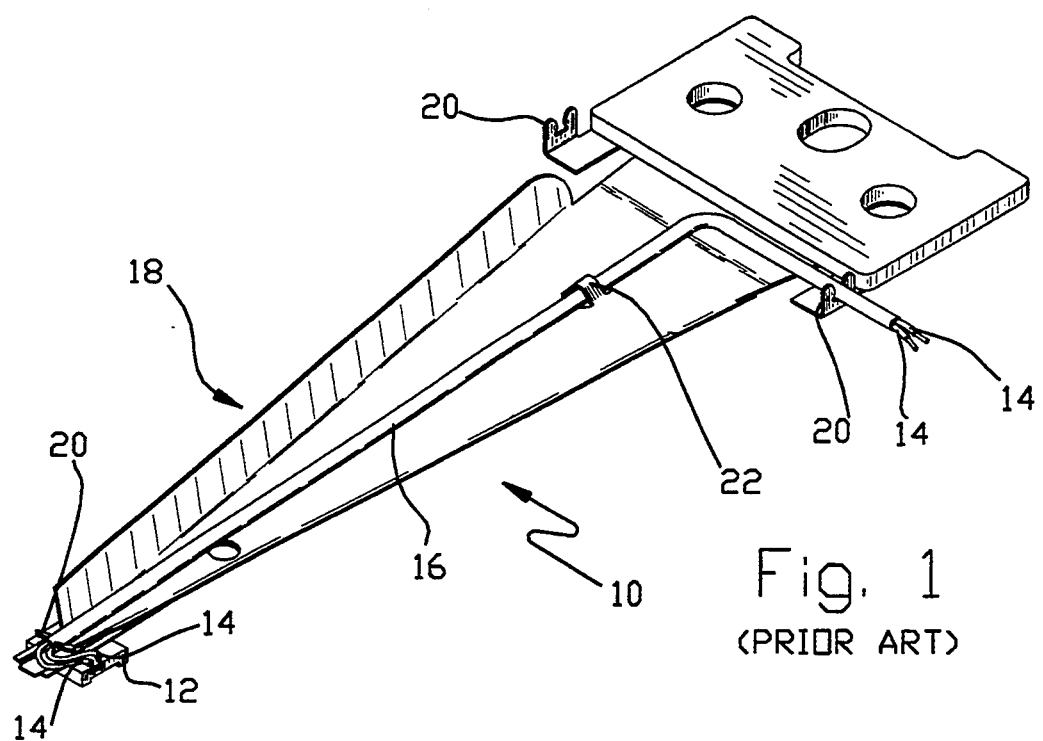
FIG. 1 is a perspective view of a conventional magnetic head suspension assembly.

As referenced in U.S. Pat. No. 4,819,094, FIG. 1 shows a conventional magnetic suspension assembly. The assembly includes a slider, or a transducer head 12 which is electrically connected by fine insulated wires 14 routed through a polytetrafluoroethylene (PTFE) tube 16 held to suspension 18 by wire captures 20 and center tang 22. As discussed previously, the prior art has some limitations which can affect the fly height variation of the head suspension assembly. The manual positioning and bonding sequence of the fine insulated wires requires exceptional dexterity and occasionally results in damage to the fragile wires during assembly and repair. In addition, routing the tube and wire assembly down the suspension and subsequent attachment via wire captures or center tangs can induce a static bias to the slider body, ultimately affecting the fly height of the slider. Adding to the situation is the difficulty in achieving the same conductor routing near the head each time, resulting in bias variability making design compensation for such bias a difficult proposition. Spatial considerations are beginning to target the PTFE tubing and wire captures upon the suspension as limiting factors as the disk stacking density increases.

The preferred form of the invention in FIG. 2 through 6 portrays a prepatterned film carrier strip 50 with conductor elements 52 and magnetic head suspension assembly 54 attached.

Figure 2:
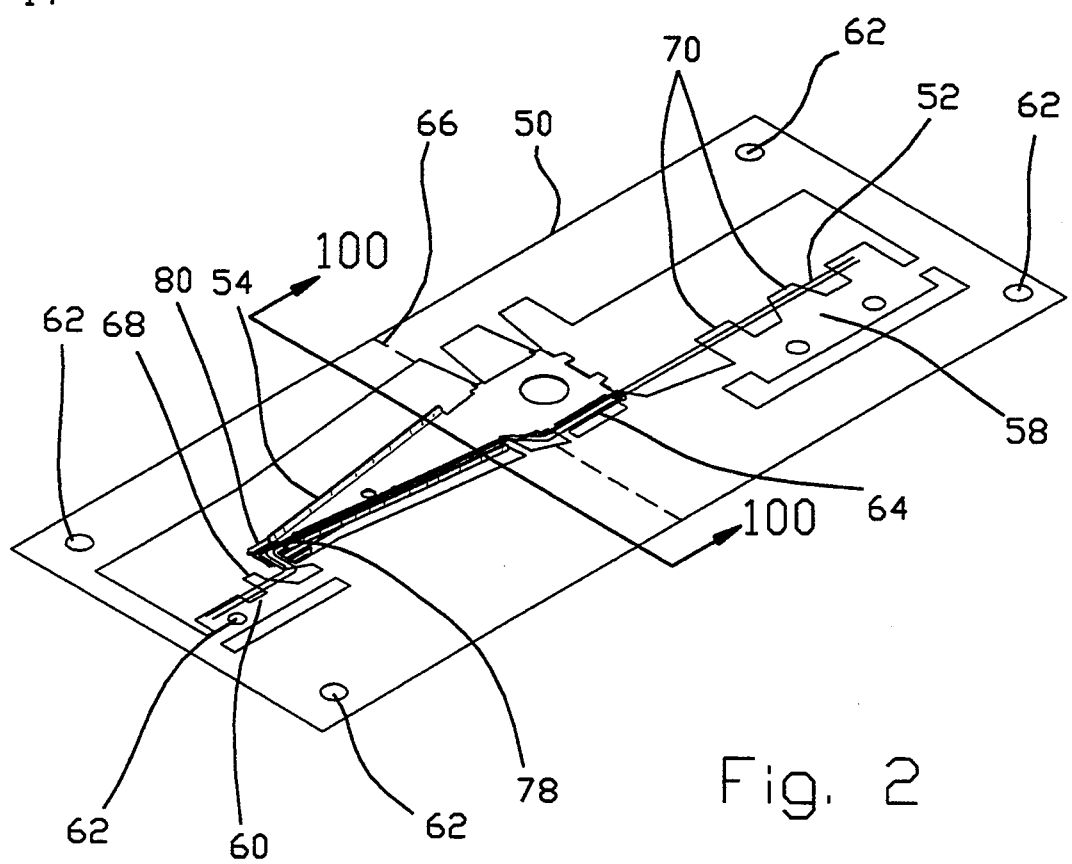
FIG. 2 is a perspective view of the preferred embodiment showing a head suspension assembly with carrier strip interconnect attached prior to final assembly step.
Figure 3:
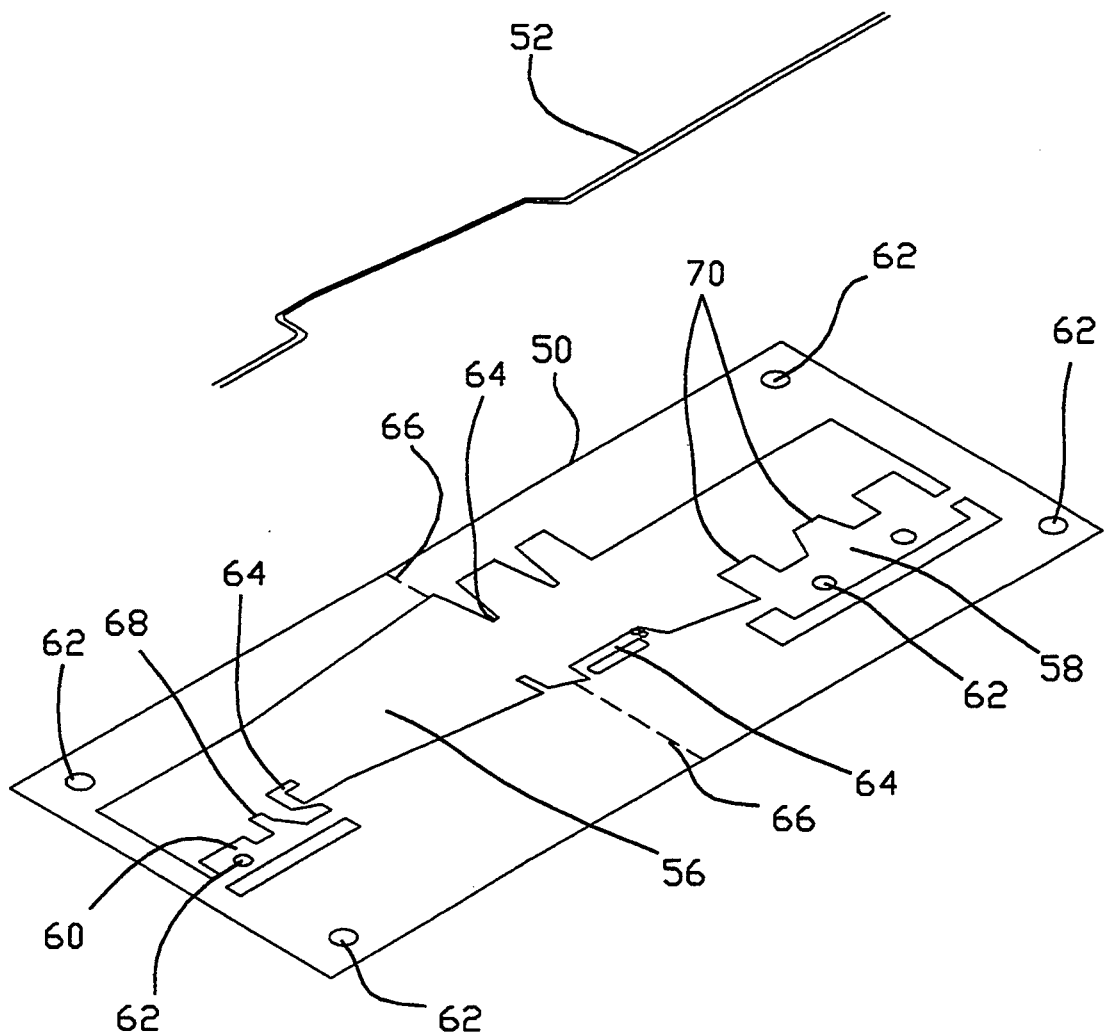
FIG. 3 is an exploded view of the preferred embodiment showing the conductive interconnect, carrier strip, and suspension.
Figure 3:
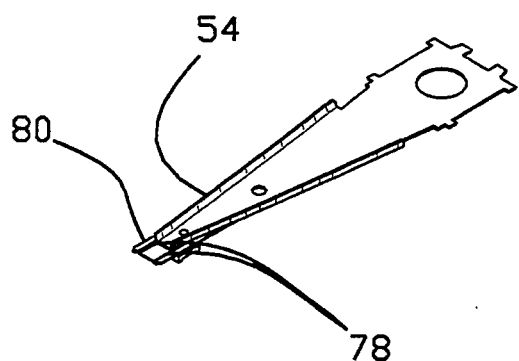
Figure 4:
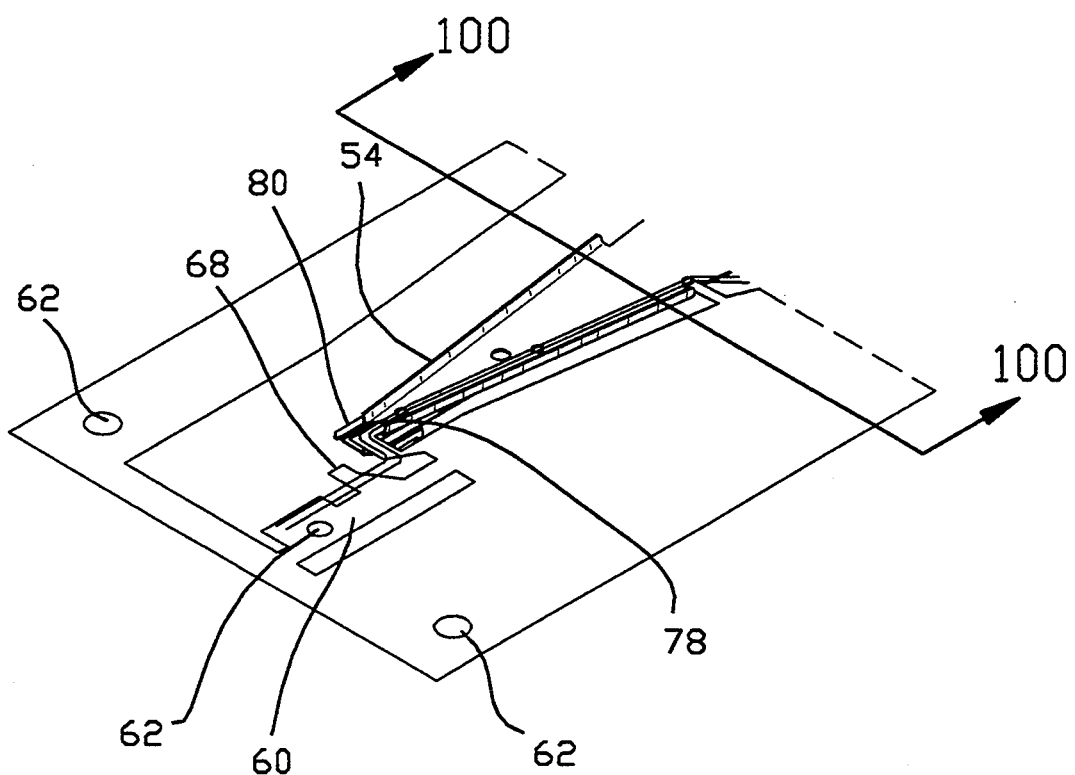
FIG. 4 is a detail of the slider mount end of the suspension showing the spaced leads of the conductive interconnect as defined within the carrier strip.

As portrayed in the assembly view of FIG. 2 and the exploded view of FIG. 3, the preferred embodiment of the invention aims to improve upon all of these problems through the predictable and orientated attachment of conductive wire elements 52 to a supporting film carrier strip 50. The orientation of the conductive wire elements as attached to the film carrier strip matches that required for routing upon the magnetic head suspension 54, thus alleviating manual positioning and routing. The service loop (bias reducing loop of unrestrained conductors near the head) of the embodied invention improves upon prior art through the controlled length and geometry of the conductive elements within the loop region. In addition, the wire capturing features upon the suspension can be eliminated resulting in a lower profile head suspension assembly upon excision or complete removal of the film carrier strip. The bulk of the film carrier strip itself with suspension assembly and electrical interconnect attached can provide handling and structural support during assembly operations which also provides protection from damage.

The prepatterned film carrier strip 50 can be comprised of a metal or plastic material such as PET polyester like MylarSTM of E. I. DuPont de Nemours & Co. of Wilmington, Del. or an ASTM 300 series stainless steel foil. Film thickness of 50 to 250 micrometers can provide the structural rigidity to retain the desired orientation of the conductor elements and support the entire suspension/interconnect assembly during handling and assembly operations.

The conductor elements 52 can be insulated wire, twisted or parallel such as 44 AWG diameter (or smaller) oxygen free, high conductivity copper wire with 1.7 micrometers gold plating, insulated with 5 micrometers polyurethane such as that produced by Molecu Wire of Farmingdale, N.J.

FIG. 3 portrays the patterned film carrier strip 50 including central void region 56 accommodating the attachment of the head suspension assembly 54, a fixturing tab 58, for accommodating electrical hook-up and test fixturing and fixturing tab 62 for positioning the conductor elements 52 during the head bonding operation. In addition, tooling reference features 62 within film carrier strip serve to reference conductor elements 52 and suspension assembly 54 which includes slider 80, to film carrier strip 50 and, in turn, one another.

Support patterned appendages 64 extending from the bulk of the carrier strip 50 within the central void region 56 serve as bonding sites for the conductor elements and the suspension assembly. The conductive interconnect 52 could be attached to either left or right side, down the center, and upon the top or bottom surface of the suspension assembly 54. The embodiment shown in FIG. 5 shows the film carrier strip appendage 64 in intermediate relationship between the conductive elements 52 and the suspension assembly 54 affixed in a location along the side, top surface. Another embodiment of the invention could portray the conductive elements bonded directly to the suspension assembly. The bond between the suspension assembly 54, film carrier strip appendage 64, and conductor elements 52 can be accomplished by reflowing a thermoplastic material such as the conductor element insulative coating 72 or the thermoplastic film carrier strip appendage 64. In another embodiment, the conductors could be attached to the film via an adhesive such as an acrylic, epoxy or cyanoacrylate. The film carrier strip could be bonded to the suspension assembly via adhesive bond with a polyester based adhesive film product such as GTS300 UltraflexSTM by GTS America of Warwick, R.I., or liquid dispensed epoxy or cyanoacrylate adhesives and in another embodiment, the conductors could be attached directly to the head suspension assembly using the previously mentioned adhesives.

Removal of the film carrier strip from the 10 head suspension assembly could take place via excision at the appendages 64 leaving a small segment of the appendage material and the conductive elements attached to the suspension assembly or via complete removal of the film carrier strip leaving only the conductive elements attached to the suspension.

Appendages near the slider bond site 68 and the electronics bond site 70 also function to secure the conductive elements 52 in fixedly spaced relationship. An embodiment shown in FIG. 4 portrays an appendage 68 near the slider bond site utilizing the material thickness of the film carrier strip 50 as the element defining the conductive element spacing. Additional methods of fixedly spacing the conductive elements could also be employed such as patterned features within the film carrier strip, cured adhesive globules, pins or spacers attached to the film carrier strip, or insulation thicknesses and wire coatings.

Crease or cut features 66 portray locations of structural stiffness reduction of the film carrier strip 50 for the expressed purpose of accommodating the bend of an unloaded head suspension assembly 54 and placement of the conductive elements 52 in close proximity to the slider bond sites 78.

The invention, though portrayed with two conductive elements 52, could accommodate multiple conductors such as required to satisfy the multi-wire (3 to 6 or more) needs of magneto-resistive heads.

Usage, as portrayed with more than one suspension assembly, can be utilized with assorted Winchester flexure and Whitney suspension mechanism designs, and consistent location of patterned tooling features 62 from one head suspension assembly to another allows consistent handling equipment between head suspension assembly types.

The presently disclosed carrier strip head interconnect is particularly useful in the following areas. The conductive wire leads provide means of electrical signal transfer between read/write transducer (head) and amplifier electronics. Using adhesive/thermoplastic for bonding the interconnect to the suspension secures the interconnect to the suspension, while avoiding internal stresses to the suspension during wire crimping and providing variable bond surface area, count and location. The conductor design elements provide multiple twists per linear inch, various conductor insulating coatings, various conductor metallurgies and platings, multiple conductors per interconnect and allow twisted or parallel conductor format. The spaced conductor design provides options for multiple spacing widths of fixed leads, strip lengths and locations of fixed leads, parallel and angular conductor routing at the head relative to one another. The spaced conductors at the bond sites provide means of matching conductive pad spacings on the head 78 and on the electronics, attachment to the head with limited or no manual positioning of the conductors, attachment to the electronics without manual positioning of the conductors, accommodating subassembly electrical test probe access, accommodating variable conductor count per interconnect, and positioning of multiple leads in a single operation or locating step. The fixed length service loop allows reduced variation in static bias, and allows positioning a service loop on the "left" or "right" side as well as straight out over the nose of the suspension.

The conductive leads secured to the plastic carrier strip provide novelty in the following features. Consistent interconnect routing is provided along the X and Y (horizontal) and Z (vertical) axes of the suspension assembly. The interconnect support during shipping and handling avoids damaging contact with the conductors (bends) and allows damage-free multi-axis rotation of the conductors. The plastic film carrier strip defines alignment between the interconnect and the suspension during assembly. The carrier strip can aid in avoiding conductor contact with sharp metal edges of the suspension by functioning as an intermediate substrate. The carrier strip permits securing variable conductor lengths at the electronics end, and facilitates conductor positioning and electrical test by providing a placement tab at the electronics end. Particulate entrapment within pocketed cavities (such as the tube) is avoided. Particulate generation is avoided by eliminating the wire crimping operation. Improved consistency in static bias is achieved through repeatable interconnect routing along the suspension. Installation bias is reduced by elimination of manual interconnect routing and fixing to the suspension. Static bias to the suspension is reduced by reducing the interconnect structure (i.e., tube elimination) in the radius bend area of the suspension and preforming the interconnect and the carrier strip to match pre-loaded position prior to application to the suspension. The outrigger carrier strip format reduces the chance of thermal mismatch between the suspension and the carrier by reducing contact area attached to the suspension. The interconnect/suspension and the HGA assembly are automatable due to tooling and reference features on the carrier strip. The strip format is conducive to line processing. The "left" and "right", and the top and bottom attachment of the interconnect to the suspension is facilitated. Manipulation of the carrier strip holding the suspension facilitates handling, holding and manipulating the suspension without actually holding the suspension itself, reducing potential for handling damage and/or contamination.

The presently disclosed carrier strip head interconnect improves upon the prior art in the following ways. The carrier strip allows the elimination of manual lead positioning during bonding at slide and electronic bond sites. Manual routing of the interconnect along the suspension is also avoided. The wire crimping operation is eliminated, which in turn, eliminates induced stress to the suspension, lowers the required profile of the suspension and reduces labor required for the assembly. Eliminating the need for the containment tube lowers the required profile of the suspension and reduces the mass of the interconnect assembly.

What is claimed is:

1. An electrically conductive interconnect extending between a read/write transducer at a distal end of a suspension assembly and signal processing circuitry at a proximal end of the suspension assembly of a disk drive, said interconnect comprised of:

conductive element means fixedly attached to a patterned film carrier strip along an orientation and placement latching a desired routing between the distal transducer end and the proximal circuitry end along the suspension assembly;

said conductive element means adapted and arranged in relationship to one another at both the distal transducer end and the proximal circuitry end of the interconnect to provide multiple bonding pad sites for direct electrical connection of the signal processing circuitry and the transducer thereto;

said carrier strip containing patterned open regions sized and shaped to accommodate the suspension assembly, rigid conductive element support appendages, and tooling reference features; and appendages of said carrier strip containing conductive element means-to-carrier-strip bond sites, fixedly attached to the suspension assembly with the carrier strip as an intermediary material of contact between the conductive elements and the suspension assembly.

2. An electrically conductive interconnect as in claim 1 wherein said conductive element means are selected from 44 AWG diameter or smaller oxygen-free, high-conductivity gold plated copper insulated with polyurethane.

3. An electrically conductive interconnect as in claim 1 containing one or more conductive element means to satisfy the needs of a single inductive element or a magneto-resistive read element and an inductive write element transducer.

4. An electrically conductive interconnect as in claim 3, such that said conductive elements are arranged in either parallel or twisted format with respect to one another.

5. An electrically conductive interconnect as in claim 1 wherein said film carrier strip is fabricated from metallic, cellulosic, composite, or plastic materials.

6. An electrically conductive interconnect as described in claim 5 wherein the open regions are in similar planar relationship within the carrier strip.

7. An electrically conductive interconnect as described in claim 5 wherein the film carrier strip contains patterned crease locations for z-axis bends to define interconnect orientation and placement to an unloaded suspension assembly as well as orientation to the bond sites.

8. An electrically conductive interconnect as described in claim 6 in which the film carrier strip contains patterned appendages extending within the open regions for attachment of the conductive elements and the suspension assembly.

9. An electrically conductive interconnect as described in claim 5 in which the film carrier strip contains patterned tooling and position reference features for manipulation, assembly aid, and electrical test fixturing.

10. An electrically conductive interconnect as described in claim 6 in which the conductive elements are routed along and fixedly bonded to film carrier strip appendages, which define positional relationships along X, Y and Z axes as required to match the conductive element routing desired upon the suspension assembly.

11. An electrically conductive interconnect as described in claim 10 in which the bond between the film carrier strip appendages and the conductive elements is an adhesive bond or a thermal reflow of either the carrier strip or conductive element insulation.

12. An electrically conductive interconnect as described in claim 11 further including bonding between the film carrier strip or attached conductive elements to the suspension assembly at predetermined locations along said suspension assembly as defined by the carrier strip appendages.

13. An electrically conductive interconnect as described in claim 12 wherein the bonding between the film carrier strip appendages or the conductive elements and the suspension assembly is an adhesive bond or a thermal reflow of carrier strip.

14. An electrically conductive interconnect as described in claim 13 wherein the bond places the carrier strip in intermediary relationship between the conductive elements and the suspension assembly to prevent contact between conductive element insulation and the suspension assembly during normal operation.

15. An electrically conductive interconnect as described in claim 8 wherein the carrier strip patterned appendages define a location along which the suspension and attached conductive elements are excised from the carrier strip upon final head suspension assembly.

16. An electrically conductive interconnect as described in claim 15 wherein excising is carried out by mechanical or thermal separation of the film carrier strip appendages.

17. An electrically conductive interconnect extending between a read/write transducer at a distal end of a suspension assembly and signal processing circuitry at a proximal end of the suspension assembly of a disk drive, said interconnect comprised of:

conductive elements attached to a patterned film carrier strip, such that orientation and placement of the conductive elements matches a routing between the distal transducer end and the proximal circuitry end along the suspension assembly, the carrier strip containing a patterned void region sized and shaded to accommodate the suspension assembly;

wherein the conductive elements are fixedly spaced with respect to one another to match bond site geometries at the distal transducer end and the proximal circuitry end of the suspension assembly, wherein the carrier strip holds the conductive elements together to allow physical manipulation of the interconnect to orientate and register the conductive elements as a single entity.

18. An electrically conductive interconnect as described in claim 17 with conductive elements having center to center spacing of approximately 0.1 mm to 1.2 mm at the transducer end of the interconnect.

19. An electrically conductive interconnect as described in claim 17 with conductive elements having center to center spacing of approximately 0.5 mm to 2.5 mm at the circuitry end of the interconnect.

20. An electrically conductive interconnect as described in claim 20 wherein thickness of the carrier strip material defines the spacing between the conductive elements.

21. An electrically conductive interconnect as described in claim 17 wherein the spacing between the conductive elements is defined by patterned appendages of the carrier strip, pins inserted into the carrier strip, or adhesive coating applied while spacing the conductive elements at a predetermined distance apart.

22. An electrically conductive interconnect as described in claim 17 wherein the fixed conductive element is carried across a patterned void in the carrier strip allowing access to the conductive elements for bonding to transducer pads on the transducer or to conductive pads on the signal processing circuitry.

23. An electrically conductive interconnect as described in claim 11 wherein conductive elements are fixedly spaced with parallel or non-parallel relationship to one another.

24. An electrically conductive interconnect as described in claim 17, wherein the read/write transducer is a magnetic read/write transducer, and the conductive elements in a region of fixedly spaced relationship have insulative coatings across sufficient length of said elements to allow electrical connective bonding.

25. An electrically conductive interconnect as described in claim 1 wherein said head functions as a magnetic read/write transducer.

26. An electrically conductive interconnect as described in claim 1 wherein the head functions as an optical read or write element.

27. An electrically conductive interconnect as described in claim 2, wherein conducting elements are encapsulated along entire length or at predetermined intervals with cured adhesive.

28. An electrically conductive interconnect between a magnetic read/write transducer and signal processing electronics circuitry of a magnetic disk drive comprised of:

conductive elements fixedly attached to a patterned film carrier strip along an orientation and placement matching a routing relationship determined by a head suspension assembly features;

said conductive elements adapted and arranged in relationship to one another at both a transducer end and an electronics circuitry end of the interconnect to provide multiple bonding pad sites for direct electrical connection thereto;

said carrier strip containing void patterned regions for accommodation of the suspension, rigid conductor support appendages, and tooling reference features;

said carrier strip appendages containing conductor-to-carrier bond sites, fixedly attached to the suspension with the carrier as the intermediary material of contact between the conductor and the suspension.

* * * * *

UNITED STATES PATENT AND TRADEMARK OFFICE
CERTIFICATE OF CORRECTION

PATENT NO.    : 5,391,842
DATED         : February 21, 1995
INVENTOR(S)   : Jeffry S. Bennin et al.

It is certified that error appears in the above-indentified patent and that said Letters Patent is hereby corrected as shown below:

Column 6, line 57, delete "latching" and insert therefor --matching--.

Column 8, line 24, delete "shaded" and insert therefor --shaped--.

Column 8, line 43, delete "20" and insert therefor --17--.

Column 8, line 59, delete "11" and insert therefor --17--.

Signed and Sealed this

Second Day of July, 1996

BRUCE LEHMAN

*Attest:*

*Attesting Officer*  *Commissioner of Patents and Trademarks*